United States Patent [19]
Sibley

[11] 3,927,852
[45] Dec. 23, 1975

[54] FAIL-SAFE LOGIC CIRCUITRY FOR VEHICLE TRANSPORTATION CONTROL

[75] Inventor: Henry C. Sibley, Adams Basin, N.Y.

[73] Assignee: General Signal Corporation, Rochester, N.Y.

[22] Filed: Apr. 1, 1974

[21] Appl. No.: 456,709

Related U.S. Application Data

[63] Continuation of Ser. No. 282,211, Aug. 21, 1972, abandoned.

[52] U.S. Cl.................................. 246/126; 246/125
[51] Int. Cl.² ........................................... B61L 1/02
[58] Field of Search ........... 246/125, 126, 128, 130, 246/131, 77, 247

[56] References Cited
UNITED STATES PATENTS

| | | | |
|---|---|---|---|
| 3,471,689 | 10/1969 | Wetmore | 246/125 |
| 3,660,652 | 5/1972 | Staples | 246/125 |
| 3,706,098 | 12/1972 | Geiger | 246/125 |
| 3,740,550 | 6/1973 | Geiger | 246/125 |
| 3,838,271 | 9/1974 | Ackard | 246/125 |

*Primary Examiner*—Trygve M. Blix
*Assistant Examiner*—Reinhard J. Eisenzopf
*Attorney, Agent, or Firm*—Milton E. Kleinman; Harold S. Wynn

[57] ABSTRACT

Logic circuitry in a vehicle transportation system, such logic circuitry providing fail-safe operation utilizing solid-state circuits. The logic circuitry is described relative to control of a highway crossing indicator, such circuitry selectively producing a most restrictive output signal or a least restrictive output signal in accordance with traffic conditions to the crossing indicator. A vital signal is generated that is characteristically differentiated from other signals in the circuit. The vital signal is serially transferred through gate circuits by corresponding enable signals to each gate circuit. When and only when the vital signal has been transferred along a path of gate circuits and through the logic circuitry, the crossing indicator assumes a least restrictive mode of operation.

8 Claims, 4 Drawing Figures

FAIL-SAFE LOGIC CIRCUITRY FOR VEHICLE TRANSPORTATION CONTROL

This is a continuation of application Ser. No. 282,211, filed 8/21/72, now abandoned.

BACKGROUND OF THE INVENTION

This invention relates to fail-safe control circuitry for vehicle transportation control and more particularly to solid-state digital logic circuitry for controlling a highway crossing signal indicator in a failsafe manner.

Automatically controlled transportation systems normally include logic control circuit apparatus. The logic circuitry defines the interaction of signals in the control system, such signals corresponding to sensed physical phenomenon in a real environment. Since the integrity of a logic control circuit is vital to the safe passage of a vehicle and the security of its passengers, it is highly desirable that a failure in the logic control circuit be so organized as to not allow an invalid control signal to be generated that produces a threat to the safe passage of the vehicle. Rather, the logic control circuit is designed so that any failure will produce a logically computed control signal that protects the vehicle, its passengers and other travellers in the immediate geographic area. Solid-state logic devices such as "AND" and "OR" gates are relatively small and inexpensive as compared to presently used control circuitry and have numerous other design advantages, however, they do occasionally malfunction and fail. Furthermore, the failure of such solid-state logic devices are usually random in occurrence, difficult to recognize, hard to isolate and time consuming to repair. Hence, it is difficult to forecast, heretofore, the effect of a malfunction in solid state logic circuits used in automatically controlled transportation systems. In addition, although several parity checking methods are successfully used to verify transmitted and stored data, such checking methods have proved too cumbersome and unreliable to be included in control systems where data is processed on-line. Accordingly, selected vital control functions in vehicle control systems are often performed with interconnecting relay logic designed to fail-safe by providing self-verifying relay logic and/or redundant signal paths through a common relay so that relay switch contacts common to a signal actuation coil are used in part for direct control and in part for forcing a fail-safe condition in the event the relay malfunctions. Additional fail-safe features have often been provided by using, for example, a mechanical interlock between relays so that the actuation of one relay physically denies the actuation of a second relay. Another example of relays in use is a stick relay that is initially energized from a first signal and is subsequently held energized by a second signal, thus requiring a defined signal pattern to set the stick relay. Under certain circumstances requiring a particular fail-safe operation for vehicle safety, relays have been used that rely on the force of gravity to obtain a preferred position of the armature in the event of relay failure. However, such cumbersome and relatively large and high-cost control circuitry is not acceptable for modern transportation systems which are designed to control larger numbers of relatively inexpensive vehicles.

SUMMARY OF INVENTION

The present invention provides a generalized technique for utilizing fail-safe self-verifying solid-state circuits in a vehicle transportation system configuration. According to one aspect of the invention, a vital signal is generated that is characteristically differentiated from other signals in the system. The vital signal is routed through the system configuration by serially transferring the vital signal through a series of gate circuits, each gate circuit operated by an enable signal. In the event the vital signal is blocked at any one of the gate circuits by either a logic condition or by a circuit malfunction, the lack of the vital signal at the output of the gate circuits result in the vehicle transportation system assuming a most restrictive mode of operation. On the other hand if logic conditions warrant and all circuits are operable, the vital signal is transferred through the gate circuits and the vehicle transportation system assumes a least restrictive mode of operation, when and only when the vital signal is transferred through the gate circuits. According to a further aspect of the system, techniques for utilizing the vital signal concept in hierarchical configurations utilizing more complex logical control signal evaluation is set forth. The scheme for utilizing fail-safe solid-state circuitry in a vehicle transportation system is particularly described herein as applied to control a highway crossing indicator.

It is accordingly a primary object of the present invention to provide an overall fail-safe vehicle transportation control system having built-in fail-safe facilities as described above.

It is another object of the system to provide such circuiting using solid-state semi-conductor devices.

It is yet another object of the present invention to enhance fail-safe operation capabilities for any critical circuit function used in a transportation system.

It is still a further object of the present invention to provide a fail-safe solid-state circuitry to control highway apparatus in a vehicle transportation system.

It is yet another object of the present invention to provide a method for fail-safe logical computation by a control circuit selectively producing a most restrictive output signal or least restrictive output signal.

For a better understanding of the present invention together with other and further objects thereof, reference is directed to the following description taken in connection with the accompanying drawings, while its scope will be pointed out in the appended claims.

DESCRIPTION OF THE PREFERRED EMBODIMENT

In order to provide a clear understanding of the present invention, a preferred embodiment thereof will be considered from a number of viewpoints and in an order which will best reveal its novel features and advantages. First, a description of a highway crossing control system will be provided to point out the advantageous features and organization of the computing logic. Next, a detailed description will be provided of the basic logic element gate circuit included in the highway crossing control logic. Then, it will be shown how the flow of vital signals through the component parts of the highway crossing control logic is sequenced and controlled in a fail-safe manner consistent with reliability and fail-safe requirements of a transportation system.

Figure 1:
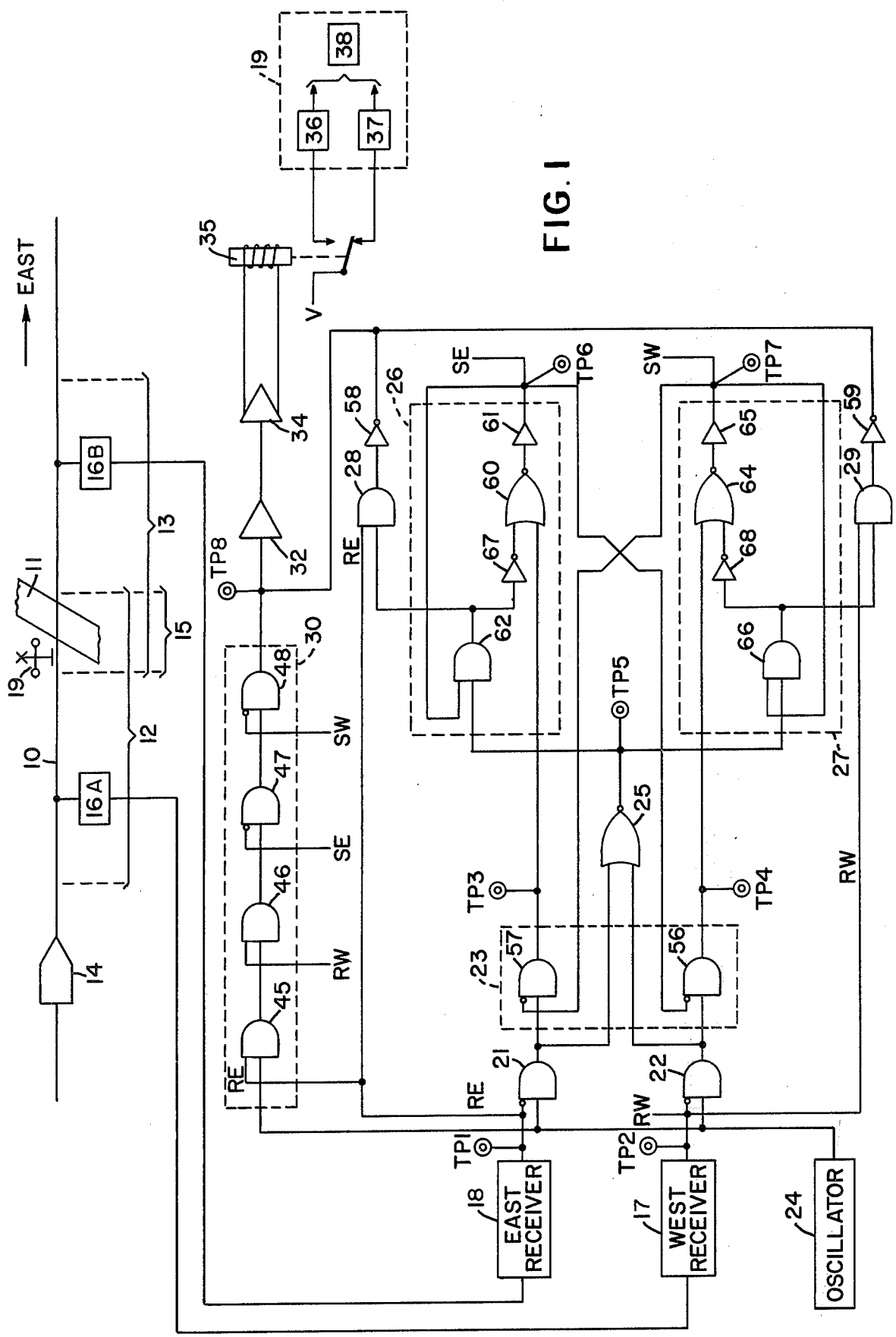
FIG. 1 is a logic diagram representation of a highway crossing control circuit and pictorially depicts a track intersecting a highway.

Referring to FIG. 1, there is shown a stretch of railway track 10 intersected by a highway crossing 11. This stretch of track 10 is divided into two overlapping track sections 12 and 13 with an overlap track section 15 covering the intersection of the highway 11 across track 10. For purposes of this illustration, the track 10 will be assumed to be in an east-west direction with track section 12 designated the west track section and track section 13 correspondingly designated the east track section. Each of the track sections 12 and 13 have associated with it corresponding track circuits 16A and 16B to defect the presence of a vehicle 14 travelling along track 10 in the respective track sections. Track circuits 16A and 16B are electronically coupled to receivers 17 and 18, respectively, located at a wayside control station. The signal outputs from receivers 17 and 18 to input gates 21 and 22 are normally "present", i.e., a logical "1" level. Conversely, the presence of vehicle 14 on track section 12 inhibits the signal output from receiver 17, i.e., the signal is "absent" or at a logical "0" level, and correspondingly, vehicle 14 detected in track section 13 inhibits the signal output from receiver 18. Accordingly, during the time vehicle 14 is present on track section 15 where track sections 12 and 13 overlap, the output signal levels from both receivers 17 and 18 are inhibited.

A crossing signal indicator 19 is located along highway 11 near the intersection of track 10 and is shown both physically and schematically in FIG. 1. The crossing signal indicator 19 is seen to include a warning device 38 which is controlled by a hold clear relay 36 and a flasher relay 37. The hold clear relay 36 is normally energized and provides an input to the warning device 38, for example a crossing gate arm which is held up as long as the relay 36 is energized. The flasher relay 37 is normally deenergized and in its energized state, relay 37 actuates flashing lights associated with warning device 38. The crossing signal indicator 19 is controlled by a connecting control relay 35. It is readily seen that when control relay 35 is energized, the crossing signal indicator 19 is dormant and the control relay 35 is in its least restrictive condition allowing highway traffic to proceed over railway track 10. On the other hand, when control relay 35 is deenergized, the crossing signal indicator 19 is active and the control relay 35 is in its most restrictive condition and stopping highway traffic from proceeding over railway track 10.

An oscillator 24 provides a vital signal alternating at a frequency of 150kh superimposed or a 4 volt D.C. level to an actuation circuit 30. Output signal levels present from both receiver 17 and receiver 18 indicates that track sections 12 and 13 are clear of vehicles. These output signal levels gate the alternating signal from oscillator 24 through actuation gating circuit 30 to a buffer amplifier 32, provided that inhibiting signals are not inputted to actuation gating circuit 30 from other logical operations yet to be described. The gated vital signal transferred to buffer amplifier 32 is an alternating binary signal, corresponding to the alternating vital signal from oscillator 24, superimposed on a D.C. level. Buffer amplifier 32 initially blocks the D.C. component of its input signal and the remaining alternating binary component is rectified, filtered and amplified therein. The resultant signal is applied to a driver 34 for further amplification to energize a control relay 35 that controls the previously described circuitry associated with highway crossing signal indicator 19. During such times that relay 35 remains energized, the highway crossing signal indicator remains dormant, i.e., no visual indication or warning is produced for the highway crossing. It should be noted that buffer amplifier 32 produces an output signal to energize relay 35 when and only when an alternating signal is transferred to buffer amplifier 32. Conversely, when the output signal level from receivers 17 or 18 is absent indicating that a vehicle is detected in track section 12 or 13 by track circuits 16A or 16B, respectively, the alternating binary signal from oscillator 24 is blocked in actuation circuit 30. Accordingly, only a D.C. signal level is received by buffer amplifier 32, and, effectively, the entire signal is blocked and relay 35 deenergizes. When relay 35 is deenergized, the highway crossing signal indicator 19 is actuated to provide a warning of an oncoming vehicle approaching the highway intersection along track 10.

The alternating vital signals from oscillator 24 are additionally connected to east input gate 21 and west input gate 22. An inversion ball at the signal input lead from receivers 17 and 18 to gates 22 and 21, respectively, indicates that gates are conductive of the alternating vital signals when the signal from corresponding receivers 17 or 18 is absent; i.e., a binary zero. The inversion ball symbol is used throughout the figures to indicate the described inverted logic effect corresponding to a signal level inverting amplifier. It should now be understood, and the particular circuit will be further described with reference to FIG. 2, that AND gates depicted on FIG. 1, for example, gates 21 and and 22, have a first input for an alternating vital signal superimposed on a D.C. level and a second input for an enable signal level that permits the first input signal to be transferred to the output terminal of the gate. The first input signal is designated as the vital signal and the second input signal is designated as the enable signal. An enable signal from receiver 18 when vehicle 14 is detected in west track section 12, transfers the alternating vital signal from oscillator 24 through west input gate 22 and when vehicle 14 is detected in east track section 13, the alternating vital signal from oscillator 24 is gated through east input gate 21 by a transfer signal from receiver 18. The outputs from west receiver 17 and east receiver 18 are designated as RW and RE, respectively, on FIG. 1. Each of the input gates 21 and 22 is connected to a cross-inhibit circuit 23 that sets an east stick circuit 26 in response to a gated signal from input gate 21 and, correspondingly, a west stick circuit 27 is set in response to a gated signal from input gate 22. Stick circuits 26 and 27 have the characteristic of binary devices in that they are initially energized or set by a signal from cross-inhibit circuit 23. However, the stick circuit only remains set during such time that a hold signal is applied to the stick circuit. In particular, stick circuits 26 and 27 are retained set by a signal from a hold gate 25. Stick circuits 26 and 27 are logically interconnected with gates 56 and 57, respectively, in cross-inhibit circuit 23 so that upon the setting of either one of stick circuits 26 or 27, cross inhibit circuit 23 prevents the other stick circuit from being set concurrently. The signals from east stick circuit 26 and west stick circuit 27 are designated SE and SW, respectively, on FIG. 1. Accordingly, stick circuits 26 and 27 are exclusively set by cross-inhibit circuit 23 which provides for setting a first one of stick circuits 26 and 27 and prevents the other stick circuit from being set until the first stick circuit has been reset. Input gates 21 and 22 additionally connect to hold gate 25 which provides a holding signal to either one of stick circuits 26 or 27 that had been set by a signal from cross-inhibit circuit 23. Hold gate 25 continues to hold stick circuit 26 or 27 set so long as an alternating vital signal is inputted to hold gate 25 from either one of input gates 21 or 22, indicating that a vehicle is present on track section 12 or 13.

Stick circuit 26 is seen to include an OR gate 60 that outputs an alternating binary signal to a buffer amplifier 61 whenever gate 60 receives a setting signal from cross-inhibit circuit 23 or a hold signal from gate 25 through a gate 62 and an inverter 67. The signals from cross-inhibit circuit 23 and inverter 67 are alternating vital signals that are in phase with each other. The alternating vital signal transferred through gate 60 is inputted to connecting buffer amplifier 61. Buffer amplifier 61 initially blocks the D.C. component of its input signal and the remaining alternating component is rectified, filtered and amplified therein. The output of amplifier 61 connects to cross-inhibit circuit 23 preventing the setting of stick circuit 27 when stick circuit 26 has been set. Amplifier 61 is additionally connected to the enable input terminals of gate 62 and gate 56. The signal from amplifier 61 gates the vital signal from hold gate 25 through gate 62 and inverter 67 to OR gate 60 to hold stick circuit 26 set. Gates 64 and 66, buffer amplifier 65 and inverter 68 in stick circuit 27 correspond to gates 60 and 62, buffer amplifier 61 and inverter 67, respectively, in stick circuit 26, and is correspondingly operable by connecting circuitry.

A signal SE from east stick circuit 26 is gated by a signal RE from east receiver 17 through an east holding gate 28 and inverter 58 to buffer amplifier 32. Since the east stick circuit 26 is set by a west-bound vehicle, the vital signal from stick circuit 26 is gated through holding gate 28 by signal RE when the vehicle is proceeding on track section 12, but has cleared overlap track section 15 and thus cleared highway crossing 11. During such time, the signal to buffer amplifier 32 energizes relay 35 and crossing indicator 19 becomes dormant as previously described. Correspondingly, a vital signal from gate 66 of west stick circuit 27 is gated by a signal RW from west receiver 18 through a west holding gate 29 and inverter 59 to buffer amplifier 32. Since the west stick circuit is set by an east-bound vehicle, the signal is gated through holding gate 29 when the vehicle is proceeding on track section 13, but has cleared overlap track section 15 and thus cleared highway crossing 11.

Actuation gating circuit 30 is seen to include gates 45, 46, 47 and 48 serially connected so that a signal from oscillator 24 provides a vital input to the first gate 45 which vital input is successively transferred to each of the gates to produce an output from actuation gating circuit 32, to buffer amplifier 32. Gates 46 and 45 are actuated by transfer signals from receivers 17 and 18, respectively, when the track sections 12 and 13 are clear of vehicles. Gates 47 and 48 are actuated by transfer level signals from stick circuits 26 and 27, respectively. The inversion ball of the transfer input from gates 47 and 48 indicate that the vital signal is transferred through the gate when the respective stick circuits are not set. Accordingly, the vital signal is transferred through the logic of actuation gating circuit 30 to actuate crossing signal indicator 19 when track sections 12 and 13 are clear and the stick circuits are in a reset status.

Figure 2:
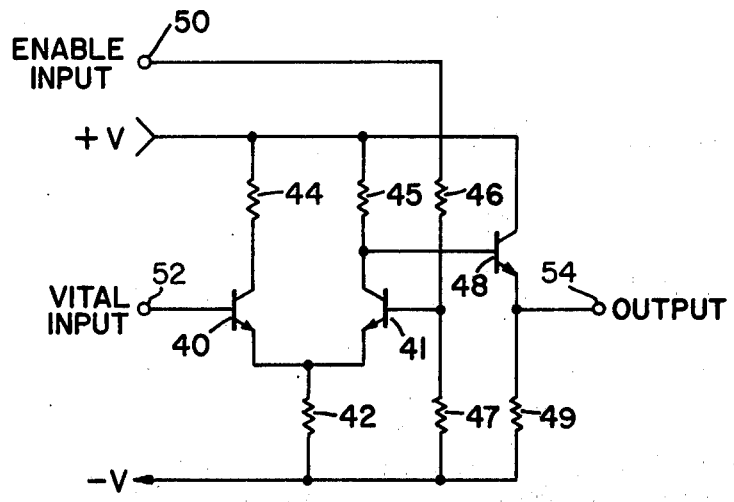
FIG. 2 is a schematic of a logic gate circuit shown in FIG. 1.

Referring now to the circuit diagram of FIG. 2 and the timing chart of FIG. 3, the AND logic circuit utilized in the control circuitry for the highway crossing will be described at this point to amplify the disclosure and to facilitate an understanding of an operational description of the circuit of FIG. 1. The logic module is seen to have a vital input terminal 52 for receipt of a vital signal that is an alternating signal superimposed on a D.C. level. An enable input terminal 50 is provided for receipt of an enabling signal level effecting the transfer of the vital signal through the logic circuit to an output terminal 54. The circuit is of solid-state design including transistors 40 and 41 with emitters commonly connected to a resistor 42. The resistor 42, in turn, is connected to a negative voltage source (not shown). Collectors of transistors 40 and 41 are connected to a positive 5 volt voltage source, designated +V, through resistors 44 and 45, respectively. The base of transistor 40 is connected to vital input terminal 52 and the base of transistor 41 is connected to a junction of voltage dividing resistors 46 and 47 which are selected to develop a 4.0 voltage level to the base of transistor 41 when an enabling signal is applied to enable input terminal 50. The collector of transistor 41 is additionally connected to the base of a transistor 48 that provides an emitter coupled output across a resistor 49 connecting the emitter of transistor 48 to the negative voltage source.

Figure 3:
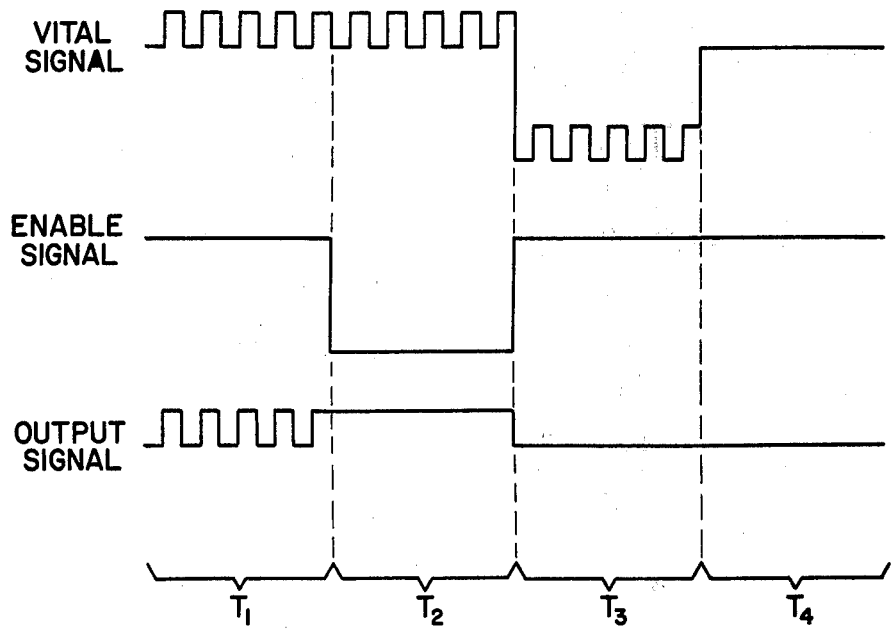
FIG. 3 is a timing diagram illustrative of the operation of the gate circuit as shown in FIG. 2.

With an enabling signal at terminal 50 applying a 4 volt level to the base of transistor 41, the transfer characteristics of the depicted circuit as shown in FIG. 3 is such that an input voltage of less than 3.8 volts D.C. at the vital input terminal 52 to the base of transistor 40 produces an output of 3.6 volts D.C. at output terminal 54 while an input signal of greater than 4.2 volts D.C. produces an output of 4.4 volts D.C. at output terminal 54. Accordingly, during time $T_1$ shown on FIG. 3 a vital input signal is applied to terminal 52 that has an alternating component with a peak to peak amplitude of 0.8 volts superimposed on a D.C. level of 4.0 volts and produces a signal at output terminal 52 with the same characteristics and magnitudes as the vital input signal. The alternating vital signal is seen to be a binary signal periodically switching between a first and a second signal level. However, as shown during time $t_2$, when an enabling signal is not applied to terminal 50 then transistor 41 is not biased to match the voltage level of the vital input signal and the resultant signal on output terminal 54 loses its alternating component and is a steady signal. Conversely, even with a proper bias to transistor 41 supplied by an enabling signal to terminal 50, if either the D.C. or A.C. components of the vital signal applied to input terminal 52 were to be missing as shown during times $t_3$ and $t_4$, respectively, the resultant effect is a steady state signal level on output terminal 54. Accordingly, the function of the enable signal applied to terminal 50 is to gate the vital signal applied to vital input terminal 52 through the circuit to output terminal 54. However, should the vital signal have been distorted, i.e., lost either its alternating component or D.C. level by a malfunction in a prior gate, for example, the signal produced at output terminal 52 will have no alternating component.

Figure 4:
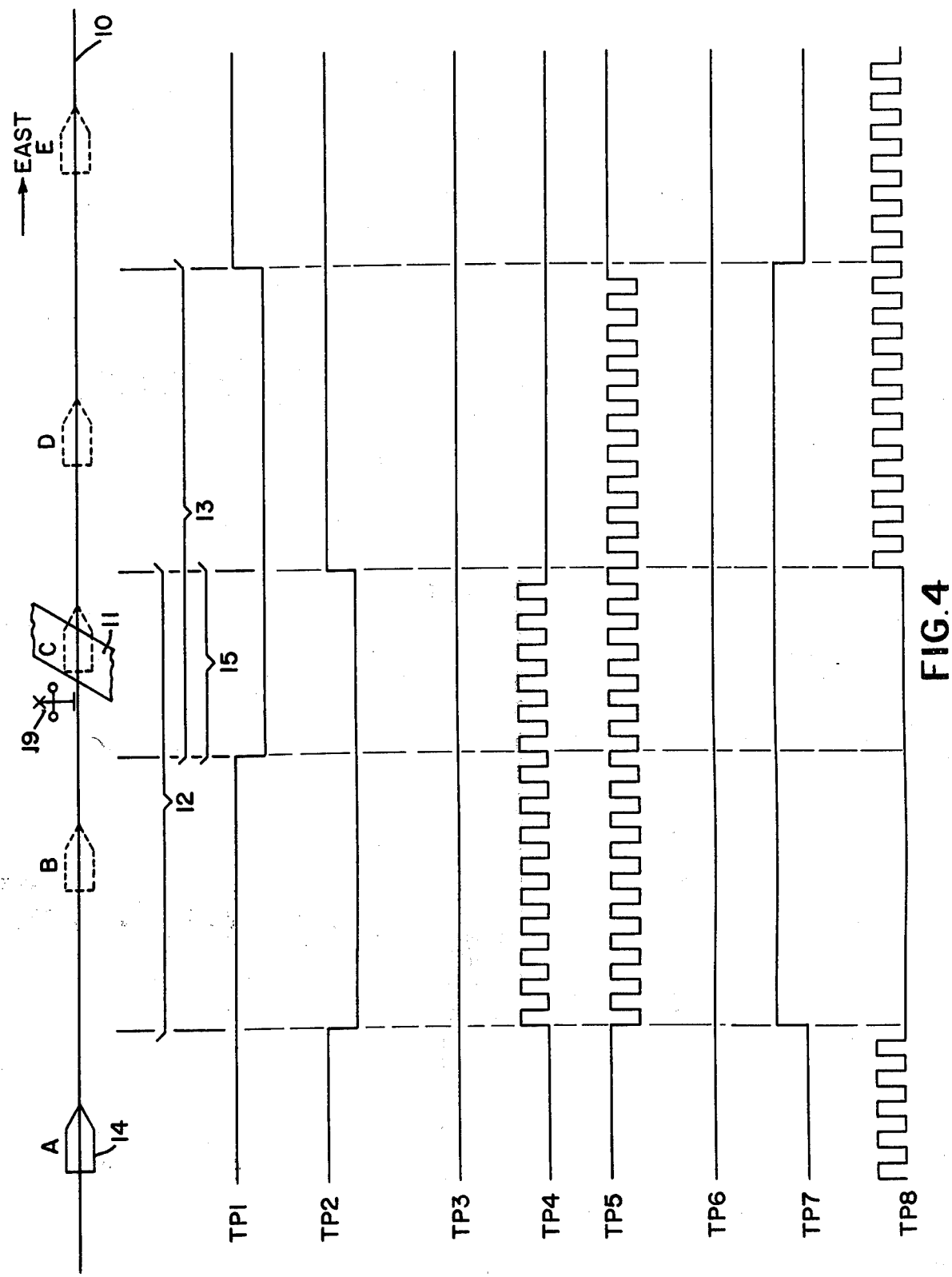
FIG. 4 is a timing diagram illustrative of the logical operation of the control circuit shown in FIG. 1 as an eastbound vehicle proceeding on the track crosses the highway.

The operation of the highway crossing control logic circuit shown in FIG. 1 will now be described with reference to the timing diagram of FIG. 4 as the vehicle 14 is moved along the track 10 in an easterly direction crossing through track sections 12 and 13, in that order. The signals shown on FIG. 4 designated as TP1-8 are correspondingly designated on FIG. 1 to indicate the source of each signal. When vehicle 14 is in position A as shown in FIG. 4 prior to entering track section 12, the signals at TP1 and TP2 from receivers 18 and 17 are present, and set signals at TP3 and TP4 from cross-inhibit circuit 23 are continuously level so that stick circuits 26 and 27 remain in a reset state. The output of hold gate 25 shown as TP5 is also continuously level and as previously described, remains in such state as long as both stick circuits 26 and 27 remain in a reset state as indicated by the signals designated as TP6 and TP7. During such time that vehicle 14 is in position A, the vital signal is gated through actuation gating circuit 30 by signals TP1, TP2, TP6 and TP7 to gates 45, 46, 47 and 48, respectively, producing an output signal designated as TP8 to buffer amplifier 32 that energizes relay 35 causing the crossing signal indicator 19 to remain dormant, i.e., non-indicating. It should be noted that a malfunction of any circuit element that interrupts the successive transfer of the vital signal through gates 45, 46, 47 and 48, in that order, would interrupt the transfer of the vital signal to buffer amplifier 32 and cause relay 35 to deenergize thus activating crossing signal indicator 19. In this manner, the malfunctioning circuit element causes the control system to fail-safe by adopting the most restrictive mode of operation. It should now be understood that the described logic system is concerned with the fail-safe logical manipulation of data providing on-line control for vehicle transportation in contrast to existing schemes for the mere transmission or storage of data that is readily adaptable to parity checking and multiple data transfers to obtain validated data.

As the vehicle 14 moves from position A to position B and enters track section 12, the signal TP2 from west receiver 17 is absent thereby blocking the transfer of a vital signal through gate 46. This terminates the vital signal output from actuation gating circuit 30 designated as TP8. The blocked vital signal in actuation gating circuit 30 inhibits the alternating signal at TP8 to buffer amplifier 32 and causes relay 35 to deenergize thus activating crossing signal indicator 19 to indicate the presence of the vehicle approaching highway crossing 11. At the same time, signal TP2 from west receiver 17 enables the transfer of a vital signal through input gate 22 and cross-inhibit circuit 23, the resultant change in signal TP4 setting stick circuit 27. In addition, the vital signal output from gate 22 is transferred through OR gate 25 to provide a holding signal shown at TP5 to stick circuit 27. An output signal level of stick circuit 27 designated as TP7 is raised by the setting of the stick circuit and the signal SW to the inversion ball input of gate 48 serves as a second block in addition to gate 46 of the transfer of the vital signal through actuation gating circuit 30.

As the vehicle proceeds from position B to position C and enters track section 15, the signal TP1 from east receiver 18 is dropped so that both signals TP1 and TP2 from receivers 18 and 17, respectively, are absent. The signal TP1 now enables a vital signal to be transferred through input gate 21 to cross-inhibit circuit 23 and OR gate 25. Since stick circuit 27 has previously been set, the vital signal is blocked in cross-inhibit signal 23 and setting signal TP3 to stick circuit 26 remains unaltered. However, the vital signal from input gate 21 is in phase with the vital signal from input gate 22 and both signals are merged through OR gate 25 to produce a holding signal TP5 that is retained during such time as the vital signal is present from either of gates 21 and 22.

As the vehicle proceeds from position C to position D, it leaves track sections 12 and 15. At such time, the signal TP2 from receiver 17 is again present thus inhibiting the transfer of the vital signal through input gate 22 to cross-inhibit circuit 23. This inhibits the set signal TP4 to stick circuit 27. However, stick circuit 27 remains set with the holding signal TP5 produced by a vital signal transferred by signal TP1 through input gate 21 and through OR gate 25. The hold vital signal TP5 is inputted to stick circuit 27 and transferred through gate 66 by enabling signal TP7. The vital signal output from gate 66 is transferred through AND gate 29 by signal TP2 from receiver 17 occurring when the vehicle 14 departs from track section 12. The vital signal from gate 29 is merged into an input to buffer amplifier 32 and designated as TP8. The resumption of the vital signal characteristic is signal TP8 to buffer amplifier 32 causes relay 35 to actuate and de-activates the crossing signal indicator 19.

It should be noted that a malfunction of any circuit element that interrupts the successive transfer of the vital signal originated by oscillator 24 and successively transferred through input gate 21, cross-inhibit circuit 23, OR gate 25, stick circuit 27, and gate 29, would cause relay 35 to deenergize thus activating crossing signal indicator 19. The control system thus fails-safe by forcing a malfunction to cause the most restrictive mode of operation to be adopted. Stick circuit 27 remains set as vehicle 14 proceeds along track sections 12 or 13 and during such time that stick circuit 27 remains set, crossing signal indicator is not activated by east receiver 17. As the vehicle proceeds from position D to position E, it departs from track section 13 and signals TP1 and TP2 from east and west receivers 18 and 17, respectively, are at a signal level indicating a vacant track. Input gates 21 and 22 are no longer conductive of a vital signal and actuation gating circuit 30 again is operative to hold relay 35 energized and the crossing signal indicator 19 dormant. It is realy seen that a failure in gates 45, 46, 47 and 48 of actuation gating circuit 30 or a failure in generation of signals SE and SW from stick circuits 26 and 27, respectively, would block the transfer of the vital signal through actuation gating circuit 30 to buffer amplifier 32. The absence of a vital signal input to buffer amplifier 32, due either to the presence of vehicle 14 approaching highway intersection 11 or a malfunction blocking the serial transfer of the vital signal through gates 45, 46, 47 and 48 causes relay 34 to deenergize and activates highway crossing indicator 19.

The circuit operation for a west-bound vehicle is essentially the same as previously described for an eastbound vehicle with the change that stick circuit 26 and input gate 21 assume the prior described function and operation of stick circuit 27 and input gate 22. Briefly, if vehicle 14 were proceeding in a westerly direction, as vehicle 14 approached position D and entered track section 13, stick circuit 26 would become set, the vital signal is blocked in actuation gating circuit 30 and relay 35 would be deenergized causing crossing signal indicator 19 to become active. This status would be maintained until the vehicle 14 still proceeding west had completely crossed the highway crossing 11 as described with reference to the timing diagram of FIG. 4 for an eastbound vehicle with the function of signals TP1 and TP3 exchanged with signals TP2 and TP4, respectively.

While there has been described what at present is considered to be the preferred embodiment of the invention, it will be obvious to those skilled in the art that various changes and modifications may be made therein without departing from the invention, and it is therefore intended in the appended claims to cover all such changes and modifications that fall within the true spirit and scope of the invention.

What is claimed is:

1. A highway crossing control system for actuation of a warning indicator to provide a closure of the highway by a vehicle moving along a track crossing the highway, including
    a first track section across the highway and extending in a first direction from the highway,
    a second track section overlapping said first track section across the highway and extending in a second direction from the highway,
    a first and second track circuit corresponding to said first and second track section and sensing the occupancy and vacancy by a vehicle along the track in said corresponding first and second track sections,
    a first and second control circuit to actuate the highway crossing warning indicator;
    a first memory circuit included in said first control circuit, said first memory circuit being set by a vehicle proceeding from said first track section to said second track section and remaining set during the time such vehicle is detected in said first and second track sections,
    a second memory circuit included in said second control circuit, said memory circuit being set by a vehicle proceeding from said second track section to said first track section and remaining set during the time such vehicle is detected in said first and second track sections;
    said first control circuit responsive to said first and second memory circuits and providing means for actuating the highway crossing warning indicator when and only when a vehicle travelling in a direction from said first track secction to said second track section is sensed by said first track circuit in said first track section, and
    said second control circuit responsive to said first and second memory circuits and providing means for actuating the highway crossing warning indicator when and only when a vehicle travelling in a direction from said second track section to said first track section is sensed by said second track circuit in said second track section.

2. The highway crossing control system of claim 1 including
    an inhibit circuit connecting said first and second memory circuit so that only one of said first and second memory circuits is set at any time.

3. The highway crossing system of claim 1 including
    a vital signal generator providing means for generating an alternating vital signal,
    a first input gate circuit providing means for gating said alternating vital signal to set said first memory circuit when said first track circuit detects a vehicle in said first track section,
    a second input gate circuit providing means for gating said alternating vital signal to set said second memory circuit when said second track circuit detects a vehicle in said second track section.

4. The highway crossing warning system of claim 1 wherein
    said first and second memory circuit each have a first input for setting each memory circuit and a second input for maintaining the memory circuit in a set state.

5. A highway crossing control system for actuation of a warning indicator to provide a closure of the highway by a vehicle moving along a track crossing the highway, including:
    a first track circuit detecting the occupancy or vacancy by a vehicle along the track on a first track portion extending across the highway and to one side of the highway,
    a second track circuit detecting the occupancy or vacancy of a vehicle along the track on a second track portion overlapping said first track portion across the highway and extending to the second side of the highway,
    a first memory circuit being set by a vehicle proceeding from said first track section to said second track section and remaining set during the time such vehicle is detected in said first and second track sections,
    a second memory circuit being set by a vehicle proceeding from said second track section to said first track section and remaining set during the time such vehicle is detected in said first and second track sections,
    a first actuation circuit responsive to said first and second memory circuits to actuate said highway warning when and only when a vehicle is approaching the highway from its one side and the vehicle is detected in said first track portion, and
    a second actuation circuit responsive to said first and second memory circuits to actuate said highway warning when and only when a vehicle is approaching the highway from its other side and the vehicle is detected in said second track portion.

6. The highway crossing control system of claim 5 including
    an inhibit circuit connecting said first and second memory circuit so that only one of said first and second memory circuits is set at any time.

7. The highway crossing system of claim 5 including
    a vital signal generator providing means for generating an alternating vital signal,
    a first input gate circuit providing means for gating said alternating vital signal to set said first memory circuit when said first track circuit detects a vehicle in said first track section,
    a second input gate circuit providing means for gating said alternating vital signal to set said second memory circuit when said second track circuit detects a vehicle in said second track section.

8. The highway crossing warning system of claim 5 wherein said first and second memory circuit each have a first input for setting each memory circuit and a second input for maintaining the memory circuit in a set state.

* * * * *